United States Patent Office

2,749,358
Patented June 5, 1956

2,749,358

PREPARATION OF OXIMES

Edward L. Reilly, Woodbury, N. J., assignor to E. I. du Pont de Nemours and Company, Wilmington, Del., a corporation of Delaware No Drawing. Application February 18, 1955, Serial No. 489,270

8 Claims. (Cl. 260—465)

The present invention relates to a novel process for the preparation of oximes. The invention relates specifically to a process for the preparation of oximes by the reaction of nitric oxide and a compound having an active methylene group.

Oximes are useful as chemical intermediates, especially for the preparation of lactams, and have also been proposed for use as catalysts, photographic sensitizers, insecticides, fungicides and bactericides. Oximes are generally prepared either by the condensation of an aldehyde or ketone with hydroxylamine or by the nitrosation of an activated methylene compound to produce a nitroso intermediate which rearranges spontaneously to the oxime. By the term active methylene compound is meant compounds of the general formula X—CH$_2$—Y in which X is a negative, i. e. electron attracting, group and Y is either an alkyl or a negative group. The ordinary negative groups, i. e. acyl, aroyl, carboxyl, carbalkoxyl, nitro, cyano, imino, and aryl groups, vary greatly in their ability to promote reaction at the adjacent methylene group. Generally, the ease of reaction of the methylene group increases with the negativity, i. e. electron attracting ability, of the adjacent group or groups.

Nitrosation of active methylene compounds has been effected by nitrous acid, an inorganic nitrite and an acid, an alkyl nitrite and an inorganic acid or base, nitrosyl chloride, nitrosylsulfuric acid and nitrogen trioxide. However, none of these nitrosating agents is equally effective with all active methylene compounds. Moreover, the known processes for the preparation of oximes involve various difficulties, such as expensive starting materials, elaborate reaction vessels, long reaction times, and information of undesirable and hard-to-remove by-products.

An object of the present invention is a simple and inexpensive process for the preparation of oximes. Another object is a simple liquid phase process for the preparation of oximes in which the formation of undesirable by-products is eliminated. Another object is a continuous process for the preparation of oximes. A further object is a process for the preparation of oximes from compounds containing an active methylene group by the action of nitric oxide.

The objects of the present invention can be accomplished by the reaction of nitric oxide with a compound containing an active methylene group at temperatures of 50 to 150° C. and pressures of 100 to 400 lb./sq. in. ga. in the presence of a variable-valence-metal salt as a catalyst. Ketones, nitriles, β-keto or β-halo acids and esters, malonic acid and its derivatives, and arylacetic acids and their derivatives can be nitrosated by the process of this invention. Variable-valence-metal salts, especially halides, cyanides, and sulfides of iron, copper, manganese, chromium, cobalt, nickel and tin are suitable catalysts for the reaction. Complex salts of these variable-valence metals, such as pyridinium salts and metal salt nitrosyls are also effective catalysts.

The following examples illustrate specific embodiments of the method of carrying out the present invention. It should be understood, however, that they are illustrative only and are not to be taken as limiting the invention. Parts are by weight unless otherwise specified. Conversions are based on the compound being nitrosated. A catalyst which is insoluble in the active methylene compound being nitrosated may be dissolved in a suitable solvent.

Example 1

A mixture of 20 parts of methyl ethyl ketone, 50 parts of pyridine and 2 parts of cupric chloride was added to an autoclave at 24° C. and the autoclave was pressurized to 195 lb./sq. in. ga. with nitric oxide. The mixture was heated to initiate the reaction, and a maximum temperature of 104° C. was attained, at which point the pressure was 225 lb./sq. in. ga. When further nitric oxide absorption was no longer apparent, the autoclave was cooled and vented. The reaction mixture was filtered to remove undissolved catalyst and treated with an excess of 10% sodium hydroxide to form the salt of the oxime produced. The caustic solution was extracted with ether to remove unreacted methyl ethyl ketone (7.5 parts) and solvent, acidified and again extracted with ether. Evaporation of the ether layer produced 5.6 parts of diacetyl monoxime (20% conversion, 32% yield).

Example 2

A mixture of 20 parts of methyl ethyl ketone, 100 parts by volume of dimethylamine and 2 parts of manganous sulfide was added to an autoclave at 40° C. and the autoclave was pressurized to 150 lb./sq. in. ga. with nitric oxide. The mixture was heated to initiate the reaction and a maximum temperature of 118° C. was attained. When the pressure decreased, additional nitric oxide was introduced to raise the pressure to the initial level. When further nitric oxide absorption was no longer apparent, the autoclave was cooled and vented. The reaction mixture was treated as described in Example 1 and 8 parts (30% conversion, 40% yield) of diacetylmonoxime was recovered.

Example 3

A mixture of 20 parts of methyl ethyl ketone, 100 parts of pyridine and 2 parts of chromous chloride was added to an autoclave and the autoclave was pressurized to 405 lb./sq. in. ga. with nitric oxide. The mixture was heated to initiate the reaction, and a maximum temperature of 100° C. was attained. The pressure increased to a maximum of 450 lb./sq. in. ga. When further nitric oxide absorption was no longer apparent, the autoclave was cooled and vented. The reaction mixture was treated as described in Example 1, and 3 parts of diacetylmonoxime (a 10% conversion) was recovered.

Example 4

A mixture of 50 parts of methyl ethyl ketone and 3.4 parts of cupric bromide was added to an autoclave and the autoclave was pressurized to 150 lb./sq. in. ga. with nitric oxide. The mixture was heated to initiate the reaction and a maximum temperature of 66° C. was attained. When the pressure decreased, additional nitric oxide was introduced to raise the pressure to the initial level. At the end of two hours, the autoclave was cooled and vented. The reaction mixture was distilled to remove unreacted methyl ethyl ketone (20 parts) and the solid obtained was recrystallized from acetone. Five parts of diacetylmonoxime (7% conversion, 42% yield) was obtained.

Other ketones which can be nitrosated by the process of this invention are acetone, ethyl isobutyl ketone, methyl cyclohexyl ketone, methyl benzyl ketone, cyclohexanone, acetophenone, and acetylacetone. Both the nitrosation of acetophenone and the recovery of the oximinoacetophenone formed must be carried out carefully as the oximinoacetophenone is easily cleaved to form benzoic acid.

This process also is suitable for the preparation of oximes of nitriles having active methylene groups, such as ethyl cyanoacetate, phenylacetonitrile, nitrophenylacetonitrile, and malononitrile.

*Example 5*

A mixture of 20 parts of phenylacetonitrile, 50 parts by volume of trimethylamine and 2 parts of manganous sulfide was added to an autoclave at 14° C. and the autoclave was pressurized to 200 lb./sq. in. ga. with nitric oxide. The mixture was heated to initiate the reaction and a maximum temperature of 104° C. was attained, at which point the pressure was 225 lb./sq. in. ga. When further nitric oxide absorption was no longer apparent, the autoclave was cooled and vented. Treatment of the mixture as in Example 1 produced 0.5 part of unreacted phenylacetonitrile and 24.5 parts of α-oximinophenylacetonitrile (98% conversion, 99% yield).

*Example 6*

A mixture of 20 parts of phenylacetonitrile, 50 parts by volume of trimethylamine and 2 parts of cupric chloride was added to an autoclave at 12° C. and the autoclave was pressurized to 212 lb./sq. in. ga. with nitric oxide. The mixture was heated to initiate the reaction and a maximum temperature of 116° C. was attained. The pressure increased to 222 lb./sq. in. ga. At the end of four hours, the autoclave was cooled and vented. The reaction mixture was extracted with dilute sodium hydroxide. Neutralization of the basic layer produced 22 parts of α-oximinophenylacetonitrile (90% conversion, 98% yield).

*Example 7*

A mixture of 30 parts of phenylacetonitrile, 30 parts by volume of pyridine and 0.5 part of ferrous sulfide was added to an autoclave and the autoclave was pressurized to 120 lb./sq. in. ga. with nitric oxide. The mixture was heated to initiate the reaction and a maximum temperature of 120° C. was attained. The pressure reached a maximum of 165 lb./sq. in. ga. When further nitric oxide absorption was no longer apparent, the autoclave was cooled and vented. Twenty-one parts of α-oximinophenylacetonitrile (56% conversion, 84% yield) was obtained from the reaction mixture.

*Example 8*

A mixture of 30 parts of phenylacetonitrile, 30 parts of pyridine and 2 parts of cuprous sulfide was added to an autoclave and the autoclave was pressurized to 172 lb./sq. in. ga. with nitric oxide. The mixture was heated to initiate the reaction and a maximum temperature of 125° C. was attained. When the pressure decreased, additional nitric oxide was introduced to raise the pressure to the initial level. When further nitric oxide absorption was no longer apparent, the autoclave was cooled and vented. Treatment of the reaction mixture as in Example 6 produced 15 parts of the α-oximinophenylacetonitrile (40% conversion, 76% yield).

*Example 9*

A mixture of 30 parts of phenylacetonitrile, 30 parts of pyridine, and 2 parts of cuprous cyanide was added to an autoclave at 36° C. and the autoclave was pressurized to 148 lb./sq. in. ga. with nitric oxide. The mixture was heated to initiate the reaction and a maximum temperature of 116° C. was attained, at which point the pressure reached 178 lb./sq. in. ga. At the end of two hours, the autoclave was cooled and vented. Treatment of the reaction mixture as in Example 6 produced 8.5 parts of α-oximinophenylacetonitrile (23% conversion, 62% yield).

*Example 10*

A mixture of 20 parts of phenylacetonitrile, 50 parts of pyridine and 4.2 parts of cupric pyridinium chloride was added to an autoclave and the autoclave was pressurized to 200 lb./sq. in. ga. with nitric oxide. The mixture was heated to initiate the reaction and a maximum temperature of 128° C. was attained, at which point the pressure reached a maximum of 225 lb./sq. in. ga. When further nitric oxide absorption was no longer apparent, the autoclave was cooled and vented. Treatment of the reaction mixture as in Example 6 produced 24.5 parts of α-oximinophenylacetonitrile (98% conversion and yield).

*Example 11*

A mixture of 20 parts of phenylacetonitrile, 20 parts of pyridine and 4 parts of Roussin's black salt $$[K(Fe_4S_3(NO)_7)]$$

was added to an autoclave and the autoclave was pressurized to 300 lb./sq. in. ga. with nitric oxide. The mixture was heated to initiate the reaction and a maximum temperature of 115° C. was attained. The pressure reached a maximum of 315 lb./sq. in. ga. After two hours, the autoclave was cooled and vented. Treatment of the reaction mixture as in Example 6 produced 13 parts (52% conversion) of α-oximinophenylacetonitrile.

*Example 12*

A mixture of 30 parts of phenylacetonitrile, 30 parts by volume of a 50/50 mixture of methanol and water, and 2 parts of ferrous sulfide was added to an autoclave and the autoclave was pressurized to 125 lb./sq. in. ga. with nitric oxide. The mixture was heated to initiate the reaction and a maximum temperature of 128° C. was attained. When further nitric oxide absorption was no longer apparent, the autoclave was cooled and vented. Treatment of the reaction mixture as in Example 6 produced 29 parts of unreacted phenylacetonitrile and 0.5 part (2% conversion, 42% yield) of α-oximinophenylacetonitrile.

The foregoing examples illustrate that while the reaction is general for active methylene compounds, independent investigation of the reaction variables for the compound being nitrosated is necessary in order to determine optimum reaction conditions and catalysts. However, some generalizations can be made about the reaction of nitric oxide and active methylene compounds.

The ease and degree of nitrosation depends primarily on the ability of the adjacent electron-attracting groups to promote nitrosation. The reaction conditions for the more active methylene compounds such as β-diketones, β-keto acids and esters, and malonic acid and its derivatives are different from those for less active methylene compounds such as monoketones, β-halo acids, esters and nitriles, and acrylacetic acids and esters. Less severe reaction conditions and/or less active catalysts are required for the nitrosation of strongly activated methylene groups. Higher temperatures and pressures, longer reaction times and more active catalysts cause oxidation of the oximes formed to acids or oxidized tarry mixtures. Thus, for example, phenylacetonitrile, a moderately active methylene compound, can be nitrosated at temperatures up to 130° C. and pressures up to 375 lb./sq. in. ga. However, tars are formed if the nitrosation is carried out at 155° C. and 190 lb./sq. in. ga.

Excess nitric oxide is preferably used and may be diluted, for example, by nitrogen or steam, to moderate the reaction. Ammonia oxidation gases from which other nitrogen oxides have been removed may be used. The excess gas may be recovered by conventional means.

The process may be carried out continuously by passing a mixture of the active methylene compound and nitric oxide either in co-current or countercurrent flow through a reaction vessel containing a supported variable-valencemetal salt catalyst at the proper reaction conditions, i. e. 50 to 150° C. and 100 to 400 lb./sq. in. ga. The liquid reaction product recovered from the vessel need only be distilled to separate the water of reaction from the desired oxime. The nitric oxide may be recycled to the reaction vessel and may be purged occasionally to remove nitrous oxide produced in the reaction.

Absorption of nitric oxide is usually complete within one to four hours after the desired reaction temperature is attained. The rate of absorption of the nitric oxide, of course, depends upon the pressure under which it is introduced to the reaction vessel. If the nitric oxide is introduced at pressures below 100 lb./sq. in. ga., the rate of absorption of the nitric oxide, and, hence, the reaction time is undesirably long. On the other hand, if the nitric oxide is introduced at pressures above 400 lb./sq. in. ga., the rapid absorption of the nitric oxide may produce an undesirably high temperature and require efficient cooling to prevent decomposition of the oxime formed. Thus, when the initial pressure in the nitrosation of methyl ethyl ketone is raised from 188 lb./sq. in. ga. to 490 lb./sq. in. ga., the conversion to diacetyl monoxime is decreased from 10% to 0% and considerable tar formation occurs. Moreover, if the nitric oxide is absorbed at too rapid a rate, the excess nitric oxide may poison the catalyst and hence decrease the conversion. For example, when the initial pressure of nitric oxide in the nitrosation of phenylacetonitrile in the presence of 0.0057 moles of a ferrous sulfide catalyst is increased from 120 to 200 lb./sq. in. ga., the conversion to oximinophenylacetonitrile is decreased from 56 to 29%.

Although oxime was produced in the nitrosation of phenylacetonitrile only when a catalyst was present, variations in the catalyst/phenylacetonitrile mole ratio (1/10 to 2/100) did not produce significant changes in conversion. The effectiveness of the catalyst depends on the type of active methylene compound being nitrosated. Thus, the conversion to $\alpha$-oximinophenylacetonitrile is increased from 73% to 100% whereas the conversion to diacetyl monoxime is decreased from 20% to 10% when a manganous sulfide catalyst in a trimethylamine solvent is used instead of a cupric chloride catalyst in a pyridine solvent. Optimum conditions for nitrosation of a particular compound can readily be determined.

Variable-valence-metal salts, especially the sulfides, halides, and cyanides of iron, chromium, cobalt, copper, and nickel, and variable-valence-metal salt complexes of these metals, especially their pyridinium chlorides and nitrosyls, are effective catalysts for the reaction. Both high and low valence states of the metal are effective in catalyzing the reaction. A solvent may be used to assure contact between the ionic catalyst and the organic compound being nitrosated. Inorganic and organic solvents which are compatible with both the catalyst and the compound being nitrosated, i. e., water, ammonium hydroxide, alcohols, alcohol-water mixtures, and amines are suitable. Slightly basic organic compounds, especially pyridine, triethylamine and trimethylamine, appear to be the most effective solvents under the reaction conditions used.

Although this invention has been described in detail in the foregoing description, many variations can be made without departing from the basic concept of the invention. I intend, therefore, to be limited only in accordance with the following claims.

I claim:

1. A process for the preparation of oximes which comprises reacting nitric oxide and a compound containing an active methylene group at temperatures of 50 to 150° C. and pressures of 100 to 400 lb./sq. in. ga. in the presence of a variable-valence-metal salt catalyst.

2. A process according to claim 1 in which the catalyst is a composition of the class consisting of the sulfides, halides, cyanides, pyridinium chlorides and nitrosyls of manganese, chromium, cobalt, nickel, iron and copper.

3. A process for the preparation of oximes which comprises reacting nitric oxide and a ketone having an active methylene group at temperatures of 50 to 140° C. and pressures of 100 to 400 lb./sq. in. ga. in the presence of a variable-valence-metal salt catalyst.

4. A process for the preparation of oximes which comprises reacting nitric oxide and a nitrile having an active methylene group at temperatures of 50 to 140° C. and pressures of 100 to 400 lb./sq. in. ga. in the presence of a variable-valence-metal salt catalyst.

5. A process for the preparation of $\alpha$-oximinophenylacetonitrile which comprises reacting phenylacetonitrile and nitric oxide at temperatures of 100 to 150° C. and pressures of 100 to 400 lb./sq. in. ga. in the presence of a catalyst of the class consisting of variable-valence-metal salts and complexes.

6. A process according to claim 5 in which the catalyst is a composition of the class consisting of the sulfides, halides, cyanides, pyridinium chlorides, and nitrosyls of manganese, chromium, cobalt, nickel, iron and copper.

7. A process for the preparation of diacetylmonoxime which comprises reacting nitric oxide and methyl ethyl ketone at temperatures of 50 to 130° C. and pressures of 100 to 150 lb./sq. in. ga. in the presence of a catalyst of the class consisting of variable-valence-metal salts and complexes.

8. A process according to claim 7 in which the catalyst is a composition of the class consisting of the sulfides, halides, cyanides, pyridinium chlorides, and nitrosyls of manganese, cobalt, chromium, nickel, iron and copper.

No references cited.